United States Patent Office 2,989,492
Patented June 20, 1961

2,989,492
COATING COMPOSITION COMPRISING NITRO-
CELLULOSE, POLYMER OF METHYL METH-
ACRYLATE AND CARBON BLACK
James J. Sanderson, Lansdowne, Pa., assignor to E. I.
du Pont de Nemours & Company, Wilmington, Del.,
a corporation of Delaware
No Drawing. Filed Mar. 17, 1959, Ser. No. 799,841
2 Claims. (Cl. 260—17)

This invention relates to coating compositions, and more particularly to coating compositions containing pigment, nitrocellulose and at least one of a specific class of copolymers of methyl methacrylate.

Methyl methacrylate lacquers, that is, coating compositions containing pigment, solvent, and as the principal film-forming constituent, polymers predominately of methyl methacrylate have found wide use in recent years because they can be applied to substrates and dried to form films and coatings which have outstanding durability and gloss retention. However, it is often difficult to prepare methyl methacrylate lacquers which form dried coatings which are free, for example, from crazing, cold cracking, incompatibility, objectionable thermoplasticity and plasticizer migration.

"Crazing" refers to a multiplicity of interconnecting cracks which appear in the baked methyl methacrylate lacquer coatings when they come in contact with solvent materials, for example, when blemishes in dried methyl methacrylate coatings are refinished. "Cold cracking" refers to relatively large fissures in dried methyl methacrylate lacquer coatings which appear when the coatings are subjected to a thermal shock. "Thermoplasticity" refers to the tendency of dried coatings of methyl methacrylate lacquers to flow at elevated temperatures. This property becomes particularly important when, for example, on hot days objects are placed on the dried coatings. "Incompatibility" as used herein refers mainly to the incompatibility of other modifying film-forming materials with polymers of methyl methacrylate in methyl methacrylate lacquers. "Plasticizer migration" refers to migration of plasticizers conventionally used in methyl methacrylate lacquers into or out of the dried lacquer coatings. The problem of plasticizer migration becomes particularly acute when successive layers of methyl methacrylate lacquers modified with different amounts of plasticizer are coated over each other.

Various methods have been devised for modifying methyl methacrylate lacquers to solve one or more of the aforementioned problems. In solving the aforementioned problems, however, there has been the further problem of retaining the inherent durability and gloss retention of methyl methacrylate lacquers. For example, materials which can be added to the methyl methacrylate lacquers to improve craze resistance often destroy the gloss, particularly the unbuffed gloss, of the lacquers or make the lacquers objectionably thermoplastic.

Superimposed over the aforementioned problems associated with the preparation of methyl methacrylate lacquers is the problem of the effect of pigments on such lacquers. White or light-colored methyl methacrylate lacquers having an excellent over-all balance of properties have been prepared. Dark colored coatings of methyl methacrylate lacquers having an excellent over-all balance of properties are more difficult to prepare. Black lacquers having an excellent balance of properties have not been prepared. Most known black methyl methacrylate lacquers are not really black, that is, jet black. They have a brownish-gray overtone which is readily apparent when such lacquers are compared, for example, with black nitrocellulose lacquers. Black methyl methacrylate lacquers, regardless of the pigment, used have not been able to compete effectively with black coating compositions based on other film-forming materials.

I have discovered compatible coating compositions which form dried coatings which have the outstanding durability and gloss retention characteristics of coatings of conventional methyl methacrylate lacquers and which are free from objectionable crazing, cold-cracking, thermoplasticity, plasticizer migration and the like. Also, the coating compositions of this invention can be formulated into lacquers which yield jet black coatings.

The coating compositions of this invention comprise carbon black, solvent and, as the sole polymeric constituent, 100 parts by weight of polymer consisting of (A) about from 50 to 70 parts by weight of lacquer-grade nitrocellulose and (B) about from 30 to 50 parts by weight of at least one copolymer having a relative viscosity of about from 1.117 to 1.196 of about from 30 to 50 parts by weight of methyl methacrylate and about from 70 to 50 parts by weight of at least one ester of methacrylic acid with a 2 to 8 carbon atom alcohol selected from the group consisting of alkanols, cyclohexyl alcohol and benzyl alcohol.

The lacquer-grade nitrocellulose used in the coating compositions of this invention can be any of the wide variety of grades commonly employed in nitrocellulose lacquers. One of the most common characteristics used to define the nitrocellulose is viscosity. The most widely used grades have viscosities of ¼ to 5 seconds. These are the most useful grades for this invention although mixtures containing small portions of grades having viscosities as high as 50 or 100 seconds can also be used. Nitrocellulose having a viscosity of ¼ to 1, and particularly ½ second is particularly preferred because such nitrocellulose yields coatings which have an optimum balance of cold-crack resistance and application properties. The ¼ second viscosity corresponds to about 50 centipoises when measured as a 12.2% solution in the solvent mixture defined in Formula A in A.S.T.M. D301–54T. On the same basis, 5 seconds corresponds to about 1,800 centipoises, 50 seconds to about 18,000 centipoises and 100 seconds to about 38,000 centipoises.

Esters of methacrylic acid with 2 to 8 carbon atom aliphatic, cycloaliphatic and aromatic alcohols are polymerized with methyl methacrylate in preparing the essential copolymer constituent of the compositions of this invention. Examples of these esters are esters of methacrylic acid with alkanols such as ethyl methacrylate, n-propyl methacrylate, isopropyl methacrylate, n-butyl methacrylate, isobutyl methacrylate, n-amyl methacrylate, n-hexyl methacrylate and 2-ethylhexyl methacrylate; cyclohexyl methacrylate; benzyl methacrylate and mixtures thereof. Within the limits specified hereinbefore, the portion of the esters of methacrylic acid with 2 to 8 carbon atom alcohols in the copolymers is preferably increased as the molecular weight of these esters decreases. Copolymers of methyl methacrylate and butyl methacrylate are preferred because they yield compositions having a particularly outstanding balance of properties.

The copolymers of methyl methacrylate used in the compositions of this invention have a relative viscosity of about from 1.117 to 1.196. Copolymers falling within this range of viscosities have a unique solubility and viscosity which makes it possible, for example, to spray thick, smooth lacquer topcoats thereof in a relatively few individual coatings. The term "relative viscosity" as used herein to specify a property of the copolymers is the value obtained by dividing efflux time of a solution A of the copolymer by the efflux time of the solvent B used in the solution. The efflux times can be measured in accordance with the procedure of A.S.T.M. D445–46–T, Method B. Solution A is a solution of 0.25 gram of the copolymer being tested in 50 cc. of ethylene dichloride and solvent B is ethylene dichloride. The efflux times are determined at 25° C. in a standard apparatus currently marketed under the designation of modified Ostwald viscosimeter, Series 50.

The copolymers of methyl methacrylate used in the compositions of this invention can be prepared by well known methods of polymerizing methyl methacrylate monomer in bulk, in solution or in granular form to produce products having the required relative viscosity. Preferably, the reaction is carried out in solution at temperatures of up to about 200° C. in the presence of a free radical catalyst such as, for example, benzoyl peroxide, azobisisobutyronitrile, ditertiarybutyl peroxide or the like.

Coating compositions which contain amounts of nitrocellulose greater than those specified do not have the outstanding gloss retention and durability of methyl methacrylate lacquers. Coating compositions containing less than the specified amount of nitrocellulose cannot be formed into jet black coating compositions. Coating compositions containing nitrocellulose and homopolymers of methyl methacrylate or known copolymers thereof which contain, for example, 75% or more of polymerized methyl methacrylate are not compatible with the nitrocellulose. This incompatibility is not readily apparent in the lacquers per se or in wet coatings thereof. It becomes apparent when wet coatings are dried and yield rough uneven coatings. The rough uneven coatings caused by the incompatibility of the film-forming constituents of such compositions cannot be satisfactorily improved by buffing. Polymers of the esters of methacrylic acid with 2 to 8 carbon atom alcohols which contain less than about 20% by weight of methyl methacrylate are compatible with nitrocellulose lacquers; however, dried coatings thereof are soft, are not durable, scratch, collect dirt and are objectionably thermoplastic. Reducing the amount of plasticizer in such compositions to increase the hardness of dried coatings thereof tends to cause cold-cracking and plasticizer migration, particularly where such coating compositions are applied over other conventional plasticized methyl methacrylate lacquers.

Examples of conventional solvents and diluents which can be used in solution polymerization of the copolymers used in the compositions of this invention and as solvents for coating compositions thereof are toluene, xylene, butyl acetate, acetone, methyl isobutyl ketone, butyl ether and other aliphatic, cycloaliphatic and aromatic hydrocarbons, esters, ethers, ketones and alcohols such as those which are conventionally used in methyl methacrylate lacquers.

Any of a wide variety of plasticizers conventionally used in methyl methacrylate lacquers can be used in the compositions of this invention in conventional amounts. Such plasticizers are, for example, benzyl butyl phthalate, dibutyl phthalate, triphenyl phosphate, 2-ethylhexyl benzyl phthalate, di(cyclohexyl)phthalate and mixtures thereof. Benzyl butyl phthalate yields coatings having a particularly good overall balance of properties and is preferred. Compositions containing 10 to 60%, and preferably 30 to 40% by weight of plasticizer based on the weight of the nitrocellulose and copolymer are usually used and are preferred.

Conventional pigments and extenders such as, for example, metal oxides, hydroxides, chromates, silicates, sulfides, sulfates, carbonates, organic dyes and lakes thereof and metal flake pigments can be used to pigment the compositions of this invention. The outstanding properties of the compositions of this invention become increasingly marked as the color of the compositions becomes darker. The compositions of this invention are particularly designed for black coating compositions, and particularly compositions pigmented with conventional carbon black pigments. Black compositions of this invention are characterized by a jetness and unique balance of properties heretofore unobtainable by any of the known methods of modifying methyl methacrylate lacquers. The amount of pigment varies, as is known in the art, with the particular pigment employed. Usually about from 1 to 10, and preferably 3 to 6 parts of carbon black are used per 100 parts of film-forming material and plasticizer.

Other conventional additives such as inhibitors, flow-control agents and the like can be added to the compositions of this invention in conventional amounts.

The various ingredients of the coating compositions of this invention can be brought together in accordance with conventional lacquer formulating techniques in any desired manner to form the finished coating compositions. Preferably, however, the compositions of this invention are formulated by milling the pigment, part of the plasticizer and a small portion of the solvent with at least part of the nitrocellulose to form a pasty or even solid mill base. The mill base is then dissolved in a solution of the copolymer, mixed with the remaining plasticizer and other additives, diluted to a suitable application of viscosity, for example, 10 to 20% solids, with one or more of the aforementioned solvents and applied. The coating compositions of this invention can be applied by any of the conventional coating techniques such as, for example, flow, dip, spray, brush or roller coating. Although the compositions of this invention can be dried at room temperature, preferably they are air dried at elevated temperature, for example, for 45 to 10 minutes at 150° to 250° F.

The coating compositions of this invention are characterized by their ability to be formulated into compatible, jet-black coating compositions, dried coatings of which have a gloss and durability similar to that of conventional methyl methacrylate lacquers and have an outstanding balance of properties such as freedom from crazing, cold-cracking, plasticizer migration and objectionable thermoplasticity. Dried coatings of the compositions of this invention also have excellent resistance to spotting and marring by gasoline and solvents for the coatings.

The coating compositions of this invention can be used, if desired, directly on bare substrates. Preferably, however, they are applied over conventional primers, sealers and the like. The coating compositions of this invention are particularly suitable in finishing systems for coating steel, especially steel automobile bodies; however, they can also be used in finishing systems for coating glass, ceramics, wood (when moderate baking temperatures are used) and metals such as aluminum, copper, magnesium and alloys thereof.

The following examples are intended to illustrate the invention and not to limit it in any way. Parts and percentages are by weight unless otherwise specified.

EXAMPLE 1

*Preparation of coating composition*

The following materials were charged to a reaction vessel and heated for 16 hours at 85° C. under autogenous pressure:

| | Parts |
|---|---|
| Methyl methacrylate | 160 |
| n-Butyl methacrylate | 240 |
| Toluene | 342 |
| Acetone | 146 |
| Benzoyl peroxide catalyst | 2.6 |

The resulting product was a 42% solution of a copolymer containing 40% of methyl methacrylate and 60% of butyl methacrylate having a relative viscosity determined as described hereinbefore of 1.157.

A mill base was prepared by grinding together the following materials:

| | Parts |
|---|---|
| Nitrocellulose (½-second viscosity wet with about 11 parts of isopropanol) | 38.1 |
| Indulin B dye | 0.44 |
| Copper naphthanate | 2.70 |
| Benzyl butyl phthalate plasticizer | 34.50 |
| Carbon black pigment (Neospectra Mark II, a product of the Columbian Carbon Company) | 24.26 |

Twenty-two parts of the mill base described above were then dissolved in a solution of 130 parts of butyl acetate, 30 parts of aliphatic hydrocarbon petroleum naphtha (boiling range: 95 to 102° C.) and 37 parts of ½-second nitrocellulose wet with 15 parts of isopropanol. The resulting solution was then thoroughly mixed with 69 parts of the 42% copolymer solution described above, 18 additional parts of benzyl butyl phthalate plasticizer, 18 more parts of butyl acetate, 48 more parts of the petroleum naphtha and 37 parts of ethyl acetate. Finally, the coating composition was diluted to spraying viscosity (about 15% solids) with a solvent mixture consisting of 2-ethoxy ethyl acetate, acetone, isopropyl alcohol, xylene and butyl alcohol in about a 3:6:4:6:1 weight ratio. The resulting coating composition of this invention contained nitrocellulose, copolymer, plasticizer, and carbon black pigment in a weight ratio of about 60:40:35:7.5.

*Evaluation of coating composition*

Steel panels treated with conventional rust inhibitor ("Bonderite," a product of the Parker Rust Proof Company) were primed and sealed in the conventional manner. The prime coat contained 100 parts of a 52% soya oil modified glycerol phthalate resin as the film-forming material and pigment consisting of 39 parts of calcium carbonate, 9 parts of carbon black and 5 parts of zinc chromate. The sealer or undercoat, which was unpigmented, contained as the principal film-forming material an ammoniated copolymer of 97.8% of methyl methacrylate and 2.2% of glycidyl methacrylate. Finally, the coating composition of this invention described above was sprayed over the primed and sealed panels and baked for 45 minutes at 200° F. to yield a topcoat about 2 mils thick.

The coated panels had a jet black color equivalent to that of panels having a conventional topcoat of standard black nitrocellulose lacquer such as that sold by E. I. du Pont de Nemours and Company under the proprietary name of "Duco" for use in finishing steel automobile bodies. The coatings did not have any undesirable brownish-gray overtone. The coatings had excellent craze resistance. Craze resistance was determined by aging the panels for 48 hours at 150° F., chilling them in an atmosphere at about 60° F. and 40% relative humidity and finally recoating one-half of the panels with the coating compositions of this invention described above and coating the other half of the panels with a mixture of acetone, toluene and xylene. No crazing was observed on either half of the panels.

The cold-crack resistance of the dried coatings described above was tested by immersing the panels alternately in 3 minute cycles in water at 120° F. and glycerine at −20° F. The panels showed no cold-cracking after 9 cycles. As a comparison, panels coated with conventional nitrocellulose lacquer cracked after 4 cycles. Also, the dried coatings had excellent freedom from objectionable thermoplasticity. The thermoplasticity of the coatings was determined by measuring the print resistance thereof. This was done by laying a gauze over the dry coating and applying a pressure of 4 pounds per square inch to the gauze. After the samples had been held for one hour at 66° C., the pressure was removed and the impression, if any, of the gauze in the coating was noted. The coatings also had a Knopp hardness of 5.8 and excellent gasoline resistance and resistance to spotting by solvents for the coatings.

The topcoat described above was smooth, uniform and glossy indicating, among other things, that the constituents in the coating composition were compatible. The coatings also had excellent durability. Durability was tested by subjecting the panels alternately to ultraviolet light, water sprays and heat for a period of over 3,000 hours in an accelerated weathering test. The panels showed no objectionable deterioration. Comparable nitrocellulose lacquer coatings developed bronzing, that is, an irridescent color, and were marked by local deterioration of the coating. The finishing systems also had excellent intercoat and coating-to-substrate adhesion.

If an equal weight of cyclohexyl methacrylate is substituted for the butyl methacrylate used in preparing the coating composition of this invention described in this example, substantially similar results are obtained.

EXAMPLE 2

A copolymer containing 55% of methyl methacrylate and 45% of butyl methacrylate and having a relative viscosity of about 1.14 was prepared by the procedure described in Example 1. Twenty-two parts of the mill base described in Example 1 were mixed with 122 parts of butyl acetate, 45 parts of toluene and 36.5 parts of ½-second nitrocellulose wet with 11.5 parts of isopropyl alcohol. To the resulting solution were then added 59 parts of a 38.1% solution of the copolymer described above together with 25 parts of benzyl butyl phthalate and 30 parts of butyl acetate. The product contained based on 100 parts of film-forming material, 65 parts of nitrocellulose, 35 parts of copolymer, 50 parts of plasticizer and 8.2 parts of pigment. The resulting coating composition had properties substantially similar to those of the product described in the preceding example.

EXAMPLE 3

A copolymer containing 30% of methyl methacrylate and 70% of butyl methacrylate and having a relative viscosity of 1.17 was prepared by the general procedure described in Example 1. A coating composition was prepared by first mixing 425 parts of butyl acetate, 213 parts of acetone and 173 parts of ½-second nitrocellulose wet with 68 parts of isopropyl alcohol with 500 parts of a 19.3% solution of a mill base similar to that described in Example 1 in an equal weight mixture of butyl acetate and ethyl acetate. To the resulting solution were added 324 parts of a 42.9% solution of the copolymer described above, 88 parts of benzyl butyl phthalate plasticizer and 172 parts of acetone. The resulting coating composition of this invention, which contained nitrocellulose, copolymer, plasticizer and pigment in a weight ratio of about 59:41:36:6.4, had properties similar to those of the compositions in the preceding examples.

EXAMPLE 4

A coating composition was prepared by first forming a 23.5% solution in an equal weight mixture of butyl acetate and ethyl acetate of 20.7 parts of the mill base described in Example 1. To this solution were added 97 parts of butyl acetate, 49 parts of ethyl acetate and 33 parts of ½-second nitrocellulose wet with 15 parts of isopropyl alcohol. The coating composition was completed by mixing therewith 15.5 parts of triphenyl phosphate plasticizer, 8.4 parts of benzyl butyl phthalate plasticizer, 65 parts of a 42.4% solution of the copolymer described in Example 1 and 49 parts of ethyl acetate. The resulting product had an over-all composition containing, per 100 parts of film-forming material, about 58 parts of nitrocellulose, 42 parts of copolymer, 45 parts of plasticizer and 7.5 parts of pigment.

The coating composition described above was applied to primed and sealed steel panels as described in Example 1 to yield products which had a smooth jet-black surface, excellent print and gasoline resistance and a hardness of 6.9 Knoop Units. The coatings showed no cold-cracking after 20 cycles in the cold-crack test described in Example 1. After the coated panels were aged for 60 minutes at 275° F., they showed no crazing in the test described in Example 1.

I claim:

1. A coating composition which comprises carbon black, solvent and, as the sole polymeric constituent, 100 parts by weight of polymer consisting of (A) about from 50 to 70 parts by weight of lacquer-grade nitrocellulose and (B) about from 30 to 50 parts by weight of at least one copolymer having a relative viscosity of about from 1.117 to 1.196 of about from 30 to 50 parts by weight of methyl methacrylate and about from 70 to 50 parts by weight of at least one ester of methacrylic acid with a 2 to 8 carbon atom alcohol selected from the group consisting of alkanols, cyclohexyl alcohol and benzyl alcohol.

2. A coating composition which comprises carbon black, solvent and, as the sole polymeric constituent, 100 parts by weight of polymer consisting of (A) about from 50 to 70 parts by weight of lacquer-grade nitrocellulose and (B) about from 30 to 50 parts by weight of at least one copolymer having a relative viscosity of about from 1.117 to 1.196 of about from 30 to 50 parts by weight of methyl methacrylate and about from 70 to 50 parts by weight of butyl methacrylate.

References Cited in the file of this patent

UNITED STATES PATENTS

| | | |
|---|---|---|
| 2,117,321 | Hill | May 17, 1938 |
| 2,292,393 | Mitchell | Aug. 11, 1942 |
| 2,860,110 | Godshalk | Nov. 11, 1958 |
| 2,907,722 | Staicopoulos | Oct. 6, 1959 |